United States Patent [19]

Linder

[11] Patent Number: 4,475,083
[45] Date of Patent: Oct. 2, 1984

[54] METHOD AND APPARATUS FOR ELECTROMAGNETICALLY MEASURING PARAMETERS OF ELECTRICALLY CONDUCTIVE HIGH TEMPERATURE MATERIALS

[75] Inventor: Sten V. Linder, Tystberga, Sweden

[73] Assignee: Studsvik Energiteknik AB, Nykoping, Sweden

[21] Appl. No.: 417,166

[22] Filed: Sep. 13, 1982

Related U.S. Application Data

[63] Continuation of Ser. No. 942,037, Sep. 13, 1978, abandoned.

[30] Foreign Application Priority Data

Sep. 19, 1977 [SE] Sweden ............................ 7710481

[51] Int. Cl.³ .................... G01N 27/72; G01R 33/12
[52] U.S. Cl. .................................... 324/227; 324/233; 324/239
[58] Field of Search ........ 324/203, 204, 222, 224–228, 324/233, 234, 236–240, 262

[56] References Cited

U.S. PATENT DOCUMENTS

| 2,098,991 | 11/1937 | Zuschlag | 324/233 |
|---|---|---|---|
| 2,154,928 | 4/1939 | Zuschlag | 324/234 |
| 2,389,190 | 11/1945 | Fermier | 324/234 |
| 3,029,380 | 4/1962 | Nicol | 324/233 |
| 3,229,198 | 1/1966 | Libby | 324/233 |
| 3,366,873 | 1/1968 | Miller et al. | 324/204 |
| 3,495,166 | 2/1970 | Lorenzi et al. | 324/228 |
| 3,670,801 | 6/1972 | Crowell et al. | 164/154 |
| 3,890,564 | 6/1975 | Watanabe et al. | 324/233 |
| 3,936,734 | 2/1976 | Brandli et al. | 324/203 |

FOREIGN PATENT DOCUMENTS

| 2327755 | 12/1973 | Fed. Rep. of Germany . |
|---|---|---|
| 0825027 | 12/1954 | United Kingdom . |
| 0836635 | 6/1960 | United Kingdom . |
| 0836723 | 6/1960 | United Kingdom . |
| 0843775 | 8/1960 | United Kingdom . |
| 0952106 | 3/1964 | United Kingdom . |
| 0991890 | 5/1965 | United Kingdom . |
| 1095562 | 12/1967 | United Kingdom . |
| 1198288 | 7/1970 | United Kingdom . |
| 1288188 | 9/1972 | United Kingdom . |
| 1372109 | 10/1974 | United Kingdom . |
| 1443407 | 7/1976 | United Kingdom . |

OTHER PUBLICATIONS

McMaster, "Non-Destructive Testing Hand Book", 1963 pp. 40.20–40.23.
Dodd, "A Portable Phase Sensitive Eddy-Current Instrument" Materials Evaluation 3/1968, pp. 33–36.
Godshall et al., "Eddy-Current Inspection of Pipe at 215° F." Petr-leum Mech. Engr. Conf. 9/1966 pp. 1–9.

Primary Examiner—Gerard R. Strecker
Assistant Examiner—Walter E. Snow
Attorney, Agent, or Firm—Burns, Doane, Swecker and Mathis

[57] ABSTRACT

Parameters of electrically conductive material at high temperature are measured by generating, by means of a transmitter coil, an electromagnetic alternating field which induces currents in the material and by detecting, by means of a receiver coil, a specific component of the secondary electromagnetic alternating field generated by the induced currents and dependent on the measured parameters, the frequency of the generated electromagnetic alternating field being such that the penetration depth of the field into the material is of the same geometrical order of magnitude as the characteristic geometrical dimension of the system, such as the distance between the receiver coil and the material. The specific component of the secondary electromagnetic alternating field is detected by means of a synchronous detector connected to the receiver coil and controlled by a phase-shifted signal from the transmitter.

21 Claims, 8 Drawing Figures

METHOD AND APPARATUS FOR ELECTROMAGNETICALLY MEASURING PARAMETERS OF ELECTRICALLY CONDUCTIVE HIGH TEMPERATURE MATERIALS

This application is a continuation of application Ser. No. 942,037, filed Sept. 13, 1978, now abandoned.

BACKGROUND OF THE INVENTION

The present invention relates to electromagnetic quantity or parameter measurement in conjunction with electrically conductive material at high temperature, wherein an electromagnetic alternating field is generated in connection with the electrically conductive material and a secondary electromagnetic alternating field, responsive to the quantity or quantities to be measured, is generated by induced currents in the electrically conductive material and detected. The electrically conductive material can, for example, be molten metal in, or flowing from a vessel, channel or the like, a continuous rod or billet of metal withdrawn in a continuous casting system, or metal slab or billet during rolling or a similar processing. The quantities which can be subject to measurement (one or more simultaneously) are, for example, a distance to the electrically conductive material, the level of the electrically conductive material, e.g. in a furnace, erosion of the lining, e.g. in a furnace, due to the corroding action of the electrically conductive material, the metallic cross-section of outflowing molten metal or metal/slag mixture, the cross-section of a metal slab or billet and the resistivity of the electrically conductive material, and thereby its temperature.

In our Swedish patent application Nos. 7605760-3 (corresponding to U.S. Pat. No. 4,138,888), 7605759-5 and 7605761-1, the contents of which are hereby referred to, there are described systems and coil configurations for electromagnetic measurement of quantities such as level, distance, flow and liner erosion in conjunction with electrically conductive liquid material at high temperature, especially molten metal. Although the described measuring systems have been found to function well in practice, there are factors in certain applications which still affect measuring accuracy and usability unfavourably, e.g. the disturbing influence of metal in the surroundings, primarily the plate jacketing or casing of containers, variations in the distance between the measuring coils themselves and to the measured object, and dimensional variations in the measuring coils as well as deficient ambiguity in the measuring signal obtained. The described measuring systems have furthermore certain limitations with regard to the possible applications of electromagnetic measurement.

The object of the present invention is therefore to provide a new method and new apparatus for electromagnetic quantity or parameter measurement of the kind mentioned in the introduction, which supplements the above-mentioned measuring systems and which circumvents the above-mentioned drawbacks and limitations.

STATEMENT OF THE INVENTION

In the method according to the present invention, a component of the secondary electromagnetic alternating field having a definite phase is detected, this phase substantially differing from the phase for the generated electromagnetic alternating field at the place of detection. The primary electromagnetic alternating field is generated with a frequency such that the penetration depth $\delta$ of the electromagnetic alternating field in the electrically conductive material involved, especially the material on which measurement takes place, is substantial, i.e. of the same geometric order of magnitude as the characteristic geometric dimension D in the measuring system. Typically, the latter is the distance between the electrically conductive material (when it is in a position of interest) and the place of detection for the secondary electromagnetic alternating field.

It has been found suitable to generate the electromagnetic alternating field with a frequency so that the ratio $(\delta/D)$ is between 0.1 and 3, preferably between 0.3 and 1.

The substantial depth penetration of the generated electromagnetic alternating field in the electrically conductive material gives rise both to induced currents in the surface layer of the material and induced currents in the interior volume of the material (designated volume currents hereinafter), these respective currents having different phases. It has been found that the currents in the surface layer in principle give rise to a component in the secondary alternating field which has a phase shift of substantially 90° in relation to the applied alternating field, while the volume currents in principle give rise to a component in the secondary alternating field which is substantially in counter-phase to (i.e., 180° out of phase) or alternatively in phase with, the applied alternating field (depending on whether the secondary electromagnetic alternating field is substantially counter-directed to, or alternatively directed in, the same direction as the applied electromagnetic alternating field).

According to a first particular aspect of the method of the present invention, the component of the secondary electromagnetic alternating field is detected which substantially corresponds only to the currents induced in the surface layer of the electrically conductive material. It has been found here that the meaurement signal obtained, representing the distance between the place of detection and the surface layer, for example, will be substantially insensitive to disturbing variations in the electromagnetic alternating field generated, and substantially less sensitive to dimensional alterations in the system. Also, material having low conductivity, such as slag flowing on top of molten metal, can be measured selectively by this method. It has furthermore been found that the measurement signal in a measuring coil placed at a side wall (e.g. in a furnace) will be considerably less sensitive to the erosion of the wall or its lining between the measuring coil and the electrically conductive material enclosed by the wall. Finally, it has been found in many cases that the measurement signal will have a completely linear course, or in any case one which is substantially linear, which signifies unambiguity between signal value and measured quantity.

According to the invention it has been found suitable to detect a component of the total electromagnetic alternating field at the place of measurement, which is phase-shifted substantially 90° in relation to the phase of the generated electromagnetic alternating field at the place of detection. As a rule, the expression "substantially 90°" includes here a greatest deviation from 90° of about 15°–20°.

According to a second particular aspect of the method according to the invention, when detecting a definite or particular component of the secondary electromagnetic alternating field, account is taken of disturbing electromagnetic field variations by determining the definite phase of the detected component, so that the influence of the disturbing field variations is generally eliminated or at least substantially reduced. This is based on the fact that disturbing alternating fields present have often been found to have a component with a substantially fixed phase, which varies with temperature, for example. During detection, by detecting the alternating field components which have a phase shifted substantially 90° in relation to the phase of said disturbing field component, the influence of variations in the latter is eliminated.

In other words, the second aspect of the method according to the invention means detection of a predetermined combination of secondary electromagnetic alternating fields arising from surface currents and volume currents. This can be performed by detecting field variations of a particular phase (i.e. variations in a particular phase direction) relative to the phase (or phase direction) of the total secondary electromagnetic alternating field. The combination, i.e. the particular phase, is selected so as to eliminate, at least substantially, the influence of field disturbances. If, for instance, the jacketing plate or casing of a furnace gives rise to a secondary alternating field that varies dependent on the temperature of the jacketing plate, then a measurement phase (or phase direction) is selected which is substantially 90° displaced relative to the phase (or phase direction) of the field variation caused by temperature variations of the jacketing plate. Also, if for instance the resistivity of a material is to be measured independently of the distance between the material and the coils, then a combination of secondary alternating fields from surface currents and volume currents is detected which field combination is responsive to variations of the resistivity but not significantly affected by said distance.

Thus, the above-mentioned method is of special importance when it is desirable to counteract the temperature-dependent disturbing influence of metal in the surroundings, primarily magnetic material and particularly jacketing plate to vessels, channels and the like. Furthermore, the method is of importance when selectively measuring a quantity in a furnace, for instance, where two independent quantities influence the secondary alternating field. Examples which can be given are: measuring the level of molten metal while electrically conductive slag is present; measuring the condition with regard to cracks of a surface, independently of the extensions of the cracks; and measuring when the electromagnetic alternating field has to penetrate a confining metal element in order to reach the measurement object or a measuring coil.

A phase shift according to the above for the detected alternating field component generally means that a secondary alternating field component is detected which, in principle, stems from currents just below the surface of the electrically conductive material. The distance to the surface for these currents is however so small that they must be regarded as existing at the surface layer, especially in consideration of the generally very much larger penetration depth for the generated electromagnetic alternating field.

According to a third aspect of the method according to the invention, the component of the secondary electromagnetic alternating field substantially corresponding solely to the currents induced in the surface layer of the electrically conductive material is detected separately, as well as the component of the secondary electromagnetic alternating field substantially corresponding solely to the volume currents in the electrically conductive material, thereby determining the values of two independent quantities which can be related to two other independent quantities of interest, such as for instance melt level and lining thickness in a furnace.

It is hereby suitable to detect the latter component by detecting a component of the secondary electromagnetic alternating field generally in phase with, alternatively in counterphase to, the generated electromagnetic field at the place of detection. This is suitably done by determining at the measuring place the size and phase of the applied electromagnetic alternating field when the electrically conductive material is not present, and also the component with said phase of the total electromagnetic alternating field, when the electrically conductive material is present. The difference between the two values determined in this way gives the desired component of the secondary electromagnetic alternating field.

By determining, for instance, the ratio between the two components of the secondary electromagnetic alternating field (and in certain cases also the size of the first-mentioned one of the two components) it has been found possible to obtain expressions inter alia for the penetration depth $\delta$ and thereby for the resistivity (and indirectly its temperature) of the electrically conductive material, for the cross-sectional area in a metal billet and for the amount of electrically conductive material in a cross-section of a stream containing a mixture of the material and slag, for example. In both latter cases, however, the frequency must be so selected that the generated electromagnetic alternating field penetrates the entire cross section. It has also been found that in a similar way it is possible to measure the depth and the extension of a surface defect of a hot material.

Detection of both components of the secondary electromagnetic field and determination of the ratio between them also gives the opportunity of measuring, with maintained accuracy, e.g. the level of the electrically conductive material in a furnace in spite of continuous erosion of the furnace liner, inside or behind which a measuring coil is arranged.

The apparatus according to the invention for electromagnetic measurement of quantities or parameters in conjunction with an electrically conductive material includes a transmitter coil for generating an electromagnetic alternating field in connection with the electrically conductive material, an alternating current source for supplying the transmitter coil with alternating current, a receiver coil arranged in connection with the electrically conductive material, for detecting electromagnetic alternating fields stemming from the supply of alternating current to the transmitter coil, and including the secondary electromagnetic alternating field dependent on the measured quantities and generated by induced currents in the electrically conductive material, and signal processing means coupled to the receiver coil for detecting and signal processing alternating voltage signals induced therein by said electromagnetic alternating fields. The apparatus is essentially characterized in that said signal processing means comprise means for selectively detecting alternating voltage signal components induced in the receiver coil, which have a definite phase relative to the alternating current supplied to the transmitter coil.

The selective detecting means preferably comprise a synchronous demodulator coupled to the receiver coil and, for control of the transmitting signal side of the apparatus via a phase control circuit, which is preferably arranged to give a variable phase shift to of the control signal for the synchronous demodulator.

In one embodiment of the apparatus according to the invention, said selective detection means can comprise first means for detecting a first induced alternating voltage signal component, phase-shifted by a definite amount in relation to the phase of the alternating current supplied to the transmitter coil, for providing a first measurement signal, and second means for detecting an induced alternating voltage signal component phase-shifted substantially 90° more, or alternatively less than the definite value, zero signal subtraction means for subtracting a signal from the signal obtained in said detection, said subtracted signal corresponding to the one obtained in said detection in the absence of the electrically conductive material, and means for determining the ratio between the first measurement signal and the signal obtained after said subtraction for providing a second measurement signal. Said first and second means can preferably comprise a first and a second synchronous demodulator, respectively.

It is to be noted that the use of a synchronous demodulator for the selective detection provides additional benefits, namely extremely good filtration of disturbing signals having a frequency other than the measuring frequency, and rectification.

It is also to be noted that the method and apparatus according to the invention can be utilized in conjunction with the majority of the measuring arrangements described in the Swedish Patent applications mentioned in the introduction. Especially applicable is that transmitter and receiver coils used in practicing the present invention can suitably be made and positioned in vessel walls according to the principles disclosed in said Swedish patent applications.

The invention will now be further described by means of non-restricting embodiments, while referring to the attached drawing. In the different figures thereon like parts, or parts corresponding to each other, have been denoted by the same reference numerals.

DETAILED DESCRIPTION

Figure 1:
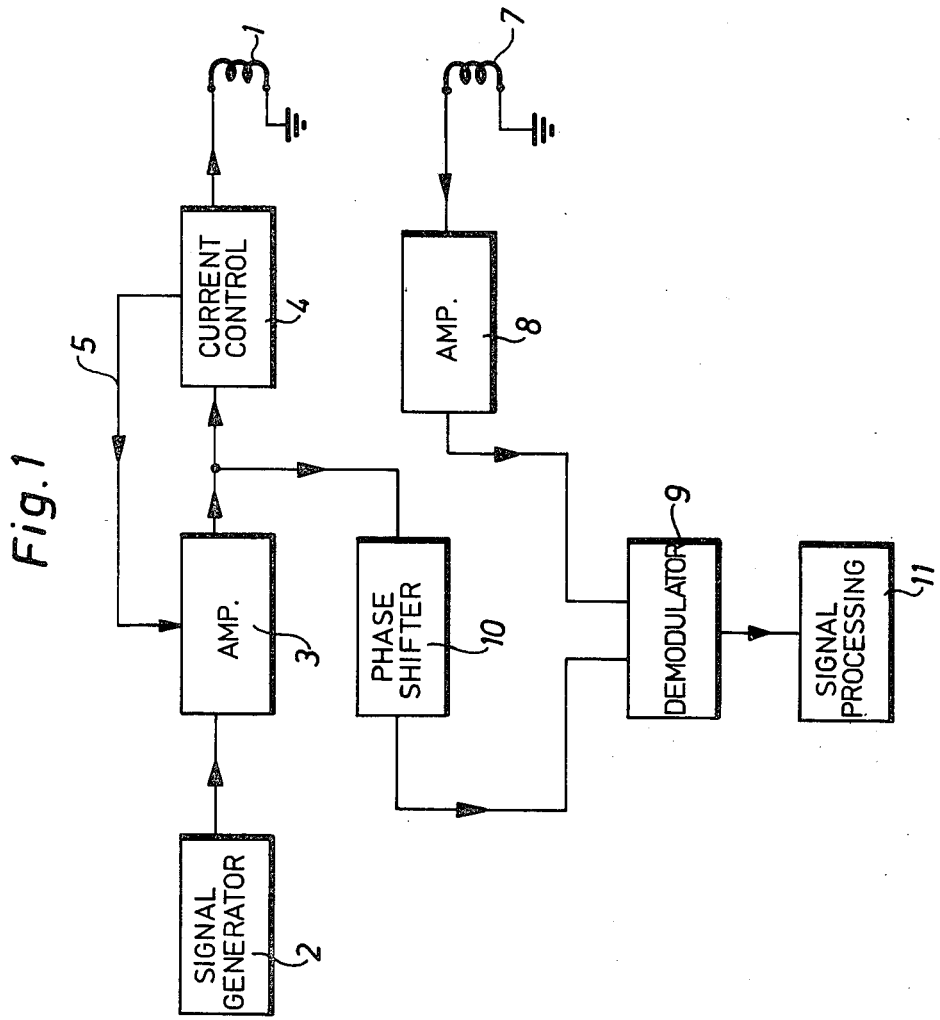
FIG. 1 is a schematic block diagram of a first embodiment of an apparatus according to the present invention.

The apparatus illustrated by a block diagram in FIG. 1 includes a transmitter coil 1, supplied with alternating current at constant frequency and constant current strength with the aid of a stable-frequency signal generator 2, e.g. a crystal-controlled oscillator or the general mains supply when the frequency is suitable, a power amplifier 3 with variable amplification, and a current control circuit 4 for sensing the magnitude of the current supplied to the transmitter coil 1 and controlling the gain of the power amplifier 3 in response thereto via a loop 5, for maintaining the current constant.

The apparatus further includes a receiver coil 7, which is connected to the signal input terminal of a conventional synchronous demodulator 9 via an input amplifier 8. The control signal input terminal of the synchronous demodulator is connected to the transmitter signal side of the apparatus via a circuit 10, i.e. to the output terminal of the power amplifier 3. The signal output terminal of the synchronous demodulator is connected to a signal processing circuit 11, which can quite simply contain a measuring instrument, a recorder or the like for registration and/or display or presentation of the magnitude of the measurement signal obtained from the synchronous demodulator 9. The signal processing circuit 11 can however also include a microcomputer, for example, for conversion of an obtained measurement, in accordance with a known relationship between the magnitude of the measurement signal obtained and the quantity of interest.

The primary task of the circuit 10 is to shift the phase of the control signal collected from the transmitter side of the apparatus, so that the synchronous demodulator 9 detects the desired component of the alternating voltage signal induced in the receiver coil 7. The phase shift, which can be provided in any way well-known to one skilled in the art, thus corresponds to the phase shift between the alternating current supplied to the transmitter coil and the resulting electromagnetic alternating field at the measuring coil (without influence from measured quantity), and the special phase shift which is desirable for the particular measuring task. This special phase shift is substantially −90° in the majority of cases.

The circuit 10 is furthermore suitably arranged to square the signal collected from the power amplifier 3, which can take place in any way well-known to one skilled in the art.

Figure 2:
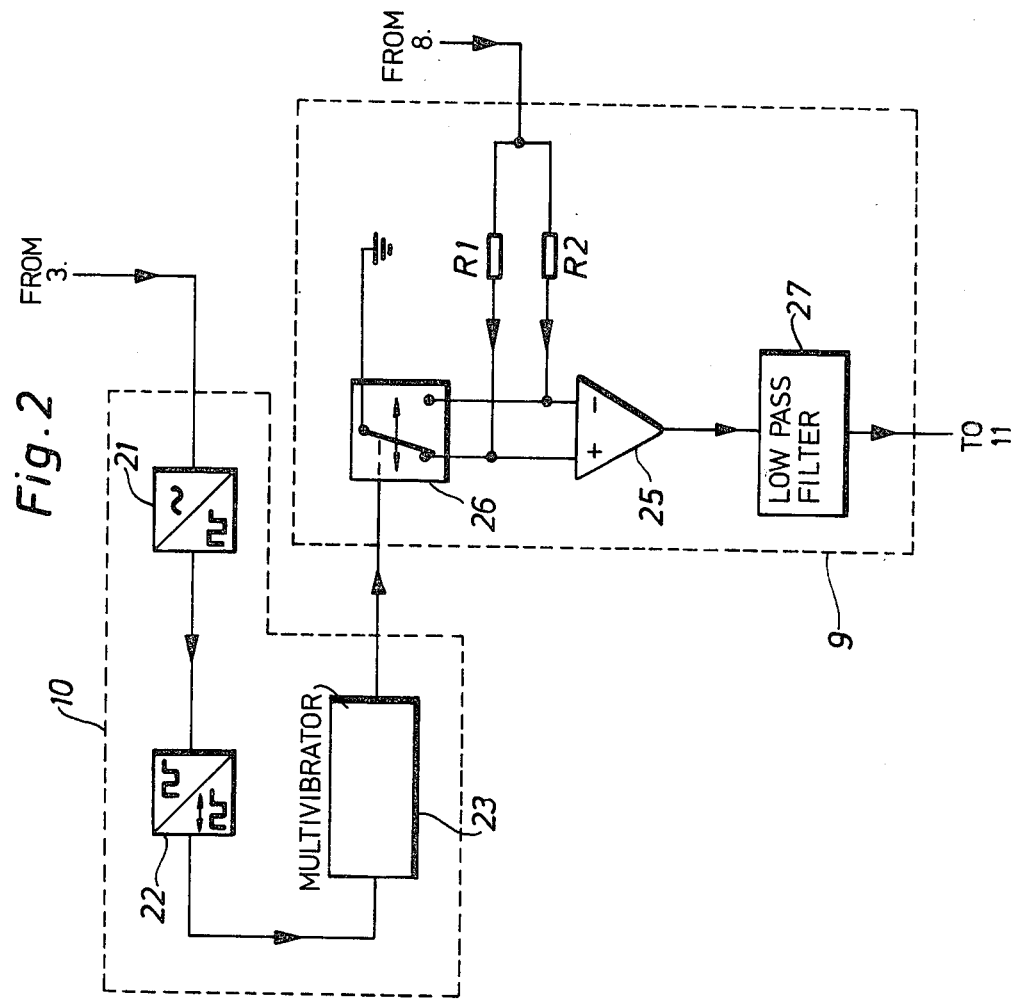
FIG. 2 is a combined block and circuit diagram of a portion of the apparatus according to FIG. 1.

FIG. 2 illustrates an example of how the circuit 10 and the synchronous demodulator 9 can be constructed.

The circuit 10 comprises a zero transition detector 21 for converting the incoming sinusoidal signal to an outgoing square wave signal with unaltered zero transition conditions, a monostable circuit 22 with adjustable lag and a multivibrator 23 synchronized by the monostable circuit 22, all coupled in series. The multivibrator 23 thus transmits a symmetrical square wave signal, the frequency of which is the same as the frequency of the sinusoidal signal obtained from the power amplifier and which is phase-shifted in response to the lag in the monostable circuit 22.

The synchronous demodulator 9 comprises a differential amplifier 25, the two input terminals of which are respectively connected via respective resistances R1 and R2 to the output terminal of the signal amplifier 8, and a linear gate circuit 26. The gate circuit has two input terminals, each of which is connected to a corresponding input terminal of the differential amplifier 25, and one output terminal which is connected to ground. The gate circuit alternately connects its two input terminals to its output terminal in response to the square wave from the multivibrator 23. This means that the two input terminals of the differential amplifier are respectively alternately connected to ground during a first half period and to the amplifier 8 via the resistance R1 during a second half period, or connected to the amplifier 8 via the resistance R2 during a first half period and to ground during a second half period. The synchronous demodulator 9 also includes a low-pass filter 27 connected to the output terminal of the differential amplifier 25, for filtering the d.c. voltage obtained.

Figure 3:
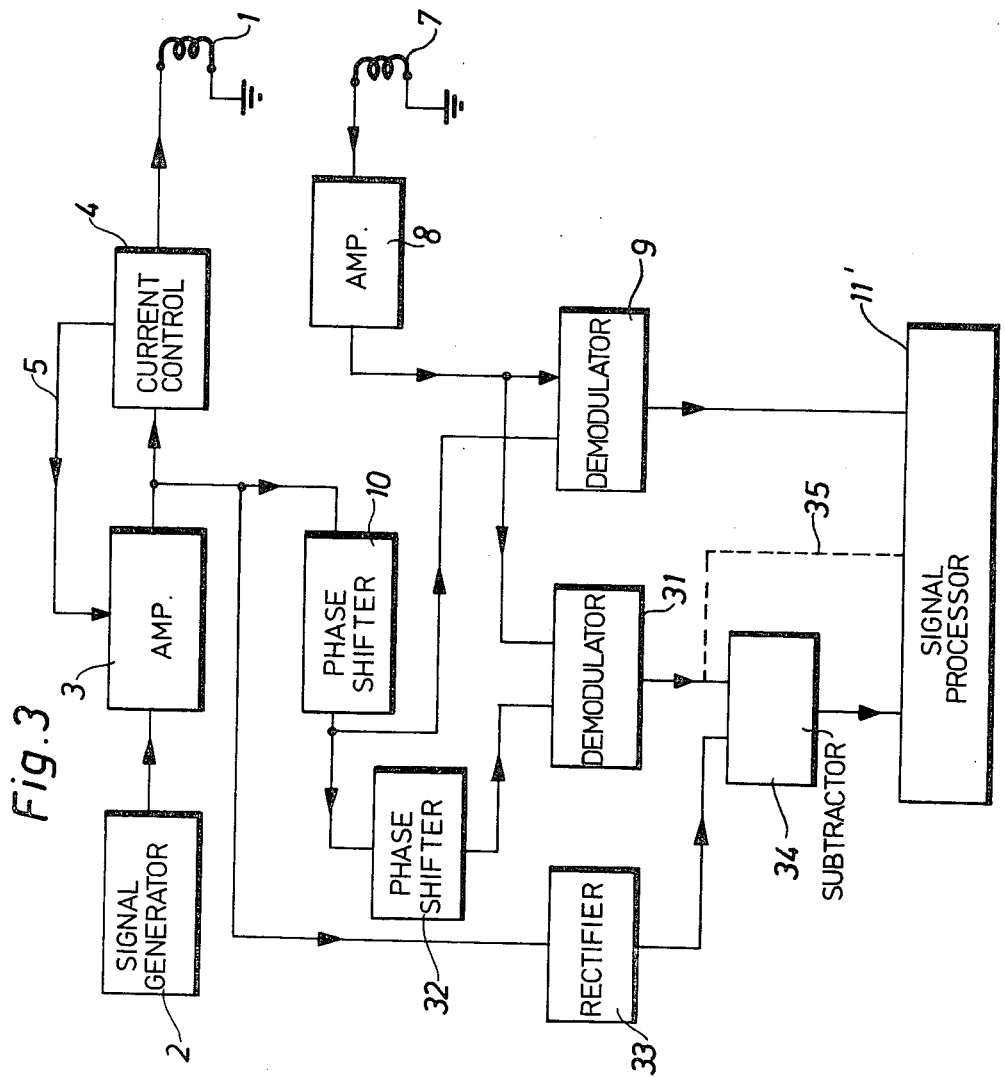
FIG. 3 is a schematic block diagram of a second embodiment of an apparatus according to the present invention.

FIG. 3 illustrates in block diagram form, an apparatus according to the invention for simultaneously detecting two components of the secondary electromagnetic alternating field sensed by the receiver coil 7. The apparatus shown is based on the apparatus according to FIG. 1, but is supplemented by a second synchronous demodulator and circuits associated therewith, and has a modified signal-processing circuit.

The signal input terminal of the second synchronous demodulator 31 is connected to the output terminal of the amplifier 8, and its control signal input terminal is connected to the output terminal of the circuit 10 via an adjustable phase-shifting circuit 32. The circuit 32 provides a further, regulatable phase shift for the control signal obtained from circuit 10. This further phase shift is generally plus or minus substantially 90°. If the size of the special phase shift, which was mentioned in conjunction with the circuit 10, is substantially 90°, the above-mentioned further phase shift means that the synchronous demodulator 31 detects the component of the total electromagnetic alternating field at the receiver coil having a phase coinciding with the phase for the applied field at the receiver coil, when there is no influence from the measured object. The supplemented apparatus contains zero signal subtracting circuits in order to determine the part of the alternating field component thus detected, which is associated with the secondary electromagnetic alternating field. These circuits comprise a rectifying circuit 33 with an adjustable output signal level, the input terminal of which is connected to the output terminal of the power amplifier 3, and the output terminal of which is connected to one input terminal of a subtraction circuit 34. The other input terminal of the subtraction circuit is connected to the output terminal of the second synchronous demodulator 31. The output terminal of the subtraction circuit 34 is connected to the modified signal processing circuit 11', as well as the output terminal from the first synchronous demodulator 9. As will be appreciated, the circuit 33 is adjusted so that a zero signal is obtained from the subtraction circuit 34 when the object to be measured does not influence the generated electromagnetic alternating field.

As is indicated by the dashed line 35, it can be desirable in certain cases to also feed the component determined by the second synchronous demodulator directly to the signal processing circuit 11'.

The modified signal processing circuit 11' can comprise simple circuits well-known to one skilled in the art for forming the ratio between the two alternating field components which have been detected, whereby an expression for a measured quantity can be obtained, possibly in combination with the measurement obtained with the aid of the first synchronous demodulator. The circuit 11' can, however, also comprise a micro-computer programmed for calculating, in response to measurements obtained relating to the two measured alternating field components, one or more sought-for quantities in accordance with known or empirically determined relationships.

Figure 4:
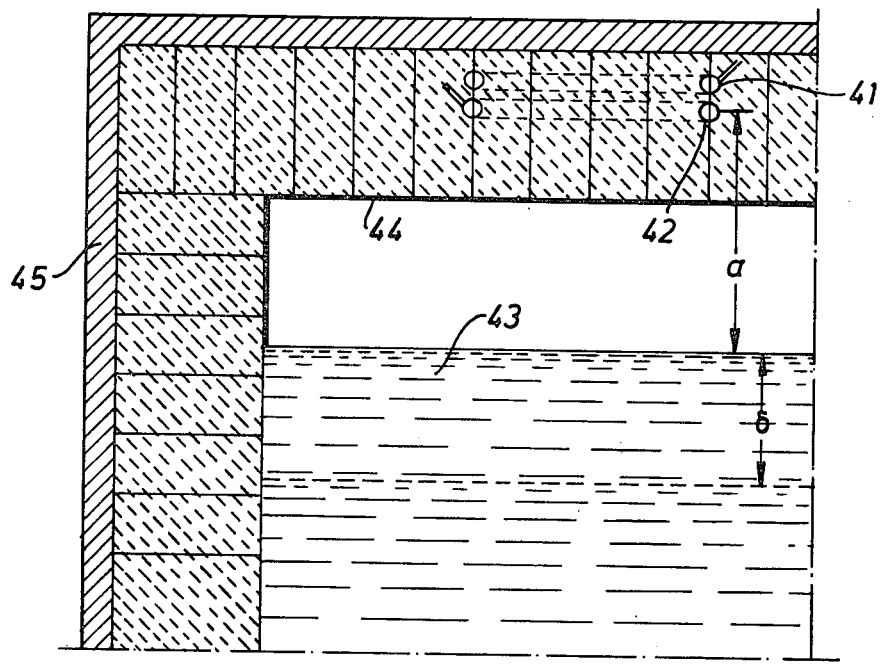
FIG. 4 is a schematic vertical sectional view showing a first arrangement of measuring coils according to the invention, for measuring the level of a metal melt in a furnace.

FIG. 4 is a schematic, vertical, partial sectional view through a furnace for molten metal, this furnace being provided with measuring coils for measuring the level of the molten metal in accordance with the present invention. The measuring coils comprise a single-turn flat transmitter coil 41 and a similarly flat single-turn receiver coil 42, which are arranged in the furnace roof, adjacent each other and parallel to the surface of the molten metal 43. The coils, which are rectangular, are arranged in the lining, consisting of bricks 44, in the furnace, and are also otherwise made in accordance with what has been described in our earlier patent applications mentioned in the introduction. The distance of the receiver coil 42 to the surface of the molten metal 43, which constitutes a measure of the level of the melt in the furnace, is denoted by a in the figure. The depth of penetration in the melt for the electromagnetic alternating field generated by the transmitter coil 41 is denoted in the figure by δ.

With the coils 41 and 42 coupled into an apparatus according to FIG. 1 and with suitably adjusted phase shift in the circuit 10, in accordance with the principle of the invention, the output signal from the synchronous detector 9 will give the level of the melt in the furnace with very good accuracy.

If the influence of a jacketing plate in the outer layer 45 of the surface does not need to be taken into consideration, a suitable phase shift in the circuit 10 can easily be adjusted when the furnace is empty, by regulating the phase shift until a zero signal is obtained from the synchronous demodulator.

On the other hand, if the influence of said plate needs to be considered, the best phase shift can suitably be determined empirically, i.e. the phase shift when disturbing variations in the output signal are as small as possible, e.g. in the manner described previously.

It will be appreciated that the measuring arrangement according to FIG. 4 can be utilized for measuring the erosion of the lining, when the melt is in contact with it, i.e. when a is equal to the distance from the receiver coil to the surface of the lining facing towards the melt.

Figure 5:
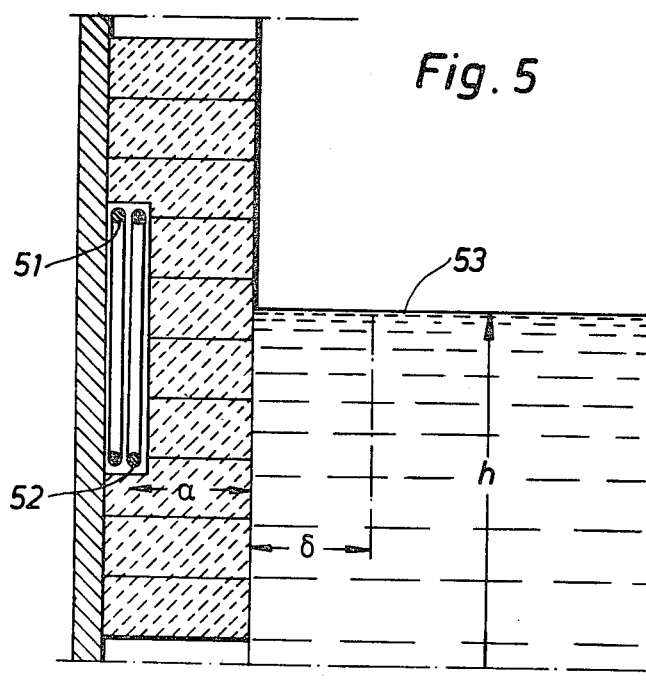
FIG. 5 is a schematic vertical sectional view showing a second arrangement of measuring coils according to the invention for measuring the level of a metal melt in a furnace as well as erosion of the furnace lining.

FIG. 5 is a schematic, vertical, partial sectional view of a furnace wall with molten metal on the inside, said wall being provided with a measuring coil arrangement for measuring the level (i.e. h) of the molten metal in the furnace as well as the erosion (i.e. a) of the lining of the furnace wall. The transmitter coil 51 and the receiver coil 52 are of the same design and are arranged in substantially the same way as the coils in FIG. 4, apart from the fact that the coils 51 and 52 are here arranged vertically, and at such a height that the level h is of interest when the molten metal "covers" approximately half of the coils. The measuring coils 51 and 52 are coupled in an apparatus according to FIG. 3, and two components of the secondary electromagnetic alternating field are detected in accordance with the inventive principles described previously.

As will be appreciated, both the detected components will be dependent on h as well as a. However, it has been found that the ratio between the two components is substantially proportional to $a/(a+\delta)$. Since $\delta$ can easily be calculated with knowledge of the measuring frequency and the material measured, a can easily be calculated.

The calculations of the relationship $a/(a+\delta)$ as well as $\delta$ and a can very easily be carried out with the help of a micro-computer incorporated in the signal processing circuit 11'. Once a has been calculated, the level h can also be simply calculated, starting from the measurement representing h obtained from the first synchronous demodulator 9, since this is affected substantially linearly by the value of a within reasonable limits for the erosion.

Figure 7:
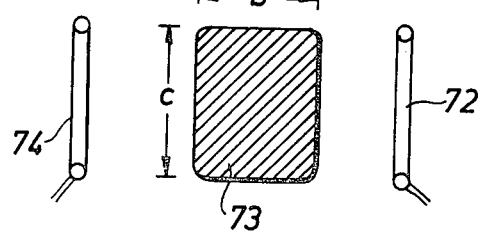
FIG. 7 is a schematic vertical sectional view showing an arrangement of measuring coils according to the invention for measuring the cross-sectional area of a metal billet.
Figure 8:
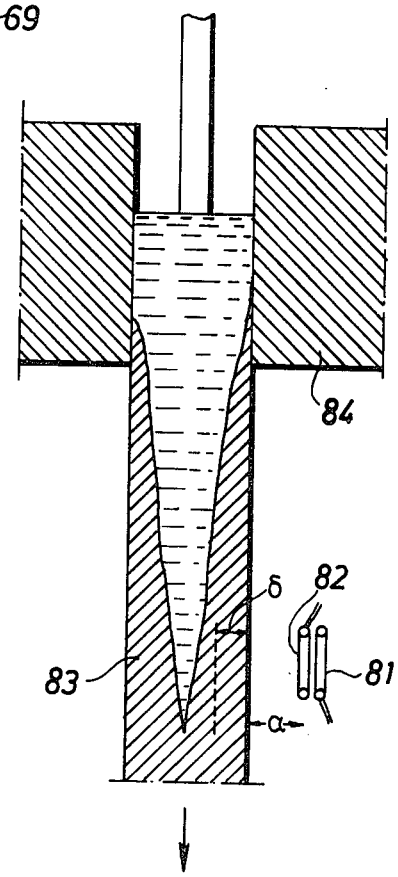
FIG. 8 is a schematic vertical sectional view showing an arrangement of measuring coils according to the invention for measuring the resistivity, and thereby the temperature, of a metal continuous billet or strand drawn out during continuous casting.

It must be emphasized that in measurement of the lastmentioned kind, the coil arrangement can be different, e.g. in accordance with what is shown in FIGS. 7 and 8 of our earlier Swedish patent application No. 7605760-3.

The measuring frequency in the applications shown in FIGS. 4 and 5 can typically be 50–100 Hz, if the molten metal is iron.

Figure 6:
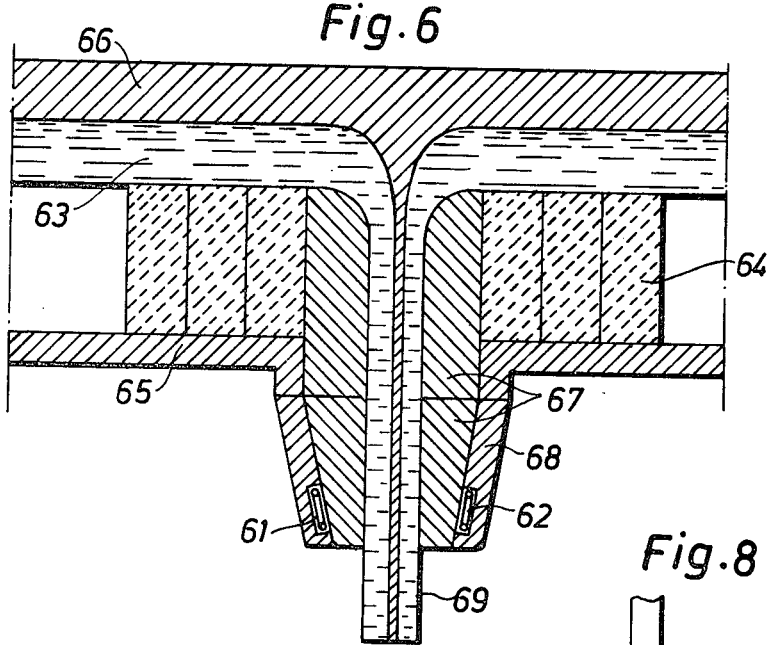
FIG. 6 is a schematic vertical sectional view showing an arrangement of measuring coils according to the invention for detecting the presence of slag in molten material flowing out of the bottom nozzle or opening of a ladle.

FIG. 6 is a schematic, vertical, partial sectional view through the bottom portion of a ladle for molten metal and accompanying slag, said bottom portion being provided with tapping means. With regard to the reference numerals, 61 and 62 denote a transmitter coil and a receiver coil, respectively, 63 molten metal, 64 the bottom lining of the ladle, consisting of bricks, 65 the outside jacketing of the ladle, 66 slag, 67 a ceramic slide gate or nozzle consisting of two parts, 68 the jacket on the lower, movable part of the nozzle, and 69 the stream (with a typical diameter of 3–5 cm) flowing out of the ladle.

The coils 61 and 62 are arranged in the lower portion of the jacket 68 on opposite sides of the stream 69. The coils can typically be substantially rectangular (suited to the shape of the nozzle) with a height of about 4 cm and a width of about 8 cm. The transmitter coil 61 can typically have 1–5 turns and a resistance of about 4Ω. The receiver coil 62 can typically have 2–8 turns and a resistance of about 8Ω. The coils are preferably constructed in the manner described in our earlier Swedish patent applications mentioned in the introduction.

The coils are coupled into an apparatus according to FIG. 3. The measuring frequency is selected so that the penetration depth of the generated magnetic field is at least equal to the diameter of the jet. If the molten metal is iron, for example, this means that the frequency is typically 150–200 Hz.

By determining the ratio between the components, detected by the apparatus according to FIG. 3, of the secondary alternating field (with a phase substantially 90° in lead of the phase for the generated alternating field at the receiver coil, and substantially the same as that for the generated alternating field at the receiver coil, respectively) it has been found possible to obtain a measurement which unambiguously (although not linearly) varies according to how large a portion of the cross-section of the stream 97 is occupied by metal. This makes it possible to determine with great accuracy when slag, i.e. the non-conductive phase, begins to come into the tapped-off stream.

FIG. 7 is a schematic vertical sectional view, of an arrangement according to the invention for determining the cross-sectional area of a whole metal billet during rolling operations, for example. The measuring arrangement, which in principle corresponds to that described in FIG. 6, involves the arrangement of a rectangular transmitter coil 71 and a rectangular receiver coil 72 on either side of the substantially parallel-epipedic metal billet 73. The planes of the coils are substantially parallel to the side surfaces of the metal billet 73. The transmitter coil 71 has a height substantially equal to the height c of the billet 73, and is arranged at a distance from the billet which is substantially equal to the width b thereof. The receiver coil 72 is suitably given approximately the same size as the transmitter coil, but can be arranged somewhat closer to the billet than the transmitter coil, in consideration of the fact that surface currents occur primarily in the surface of the billet facing away from the receiver coil. The extension of the coils longitudinally can be typically equal to their extension in height.

If the measuring frequency is now selected so that the penetration depth in the metal billet is at least equal to b, and if the components of the secondary electromagnetic alternating field corresponding substantially to induce surface currents and induced volume currents are detected, and the thus obtained measurements are divided by each other with the aid of an apparatus according to FIG. 3, it will be found that a value is obtained which is substantially proportional to $b \times c$.

It must be emphasized that the receiver coil 72 can also be arranged above or under the metal billet 73.

FIG. 8 is a schematic vertical of partial, sectional view, an arrangement according to the present invention for measuring the resistivity, and thereby indirectly the temperature, of a metal strand, drawn out in conjunction with continuous casting. A transmitter coil 81 and a receiver coil 82 are arranged adjacent each other at the side of the metal strand 83 which is drawn out from a casting mould 84. With the aid of an apparatus according to FIG. 3, the distance a between the receiver coil and the metal strand is determined (said distance can vary) by means of the measurement from the first synchronous demodulator 9, and the ratio ($\delta/a$) is determined by means of the measurement obtained by component division in the signal processing circuit 11', whereafter $\delta$, and thereby the temperature, can be easily calculated.

In conclusion, it is pointed out that an apparatus according to the invention can be used to advantage in conjunction with measuring of the kind disclosed in our previously mentioned Swedish patent application No. 7605760-3, since this means that the course of measuring signal curves obtained can be made considerably more linear. Such an application is naturally only justified when the characteristic signal course described in the mentioned Swedish patent application is not essential, e.g. from the point of view of checking.

What is claimed is:

1. An apparatus for electromagnetic quantity measurement of at least one of the resistivity, temperature, dimension and spatial location of an electrically conductive material at high temperature, comprising:
   a transmitter coil for generating an electromagnetic alternating field in the electrically conductive material, an a.c. source for supplying the transmitter coil with alternating current at a frequency such that the electromagnetic alternating field penetrates to a depth $\delta$ in the electrically conductive material;

a receiver coil located a distance D from the electrically conductive material wherein the ratio ($\delta/D$) lies between 0.1 and 3, for detecting secondary electromagnetic alternating fields dependent upon the measured parameter and generated by induced currents in the electrically conductive material; and signal processing means connected to the receiver coil for detecting and processing alternating voltage signals induced therein by said secondary electromagnetic alternating field and for distinguishing changes in the measured parameter from changes in other parameters, said signal processing means including means for selectively detecting the magnitude of alternating voltage signal components induced in the receiver coil which are phase-shifted relative to the alternating current supplied to the transmitter coil, said selective detecting means including a synchronous demodulator coupled to the receiver coil and to the a.c. source via a phase shifting circuit for substantially eliminating the effects of ambient surroundings on the electromagnetic field generated by the transmitter coil.

2. An apparatus as claimed in claim 1, characterized in that said selective detecting means comprise first means for detecting the magnitude of a first induced alternating voltage signal component, the phase of which is shifted a definite amount in relation to the phase of the alternating current fed to the transmitter coil, for providing a first measurement signal, second means for detecting the magnitude of a second induced alternating voltage signal component, the phase of which is shifted substantially 90° relative to said first induced alternating voltage signal component, zero signal subtraction means for subtracting from the signal obtained from said second detection means a signal corresponding to the signal obtained from said second detection means in the absence of electrically conductive material, and means for determining the ratio between the first measurement signal and the signal obtained after said subtraction, for providing a second measurement signal.

3. An apparatus as claimed in claim 2, characterized in that said first and said second means include said synchronous demodulator and a second detection suynchronous demodulator, respectively.

4. An apparatus as claimed in claim 1, characterized in that the operating phase of the synchronous demodulator relative to the phase of the a.c. signal fed to the transmitter coil is adjustable.

5. An apparatus as claimed in claim 1, characterized in that the characteristic geometric distance D is the shortest distance between the plane of the measuring coil and the electrically conductive material.

6. The apparatus of claim 1 wherein said receiver coil and said transmitter coil are each a flat coil.

7. The apparatus of claim 6 wherein said receiver coil and said transmitter coil each have a single turn.

8. The apparatus of claim 1 wherein the central axes of said receiver coil and said transmitter coil are disposed perpendicular relative to said surface of the metal.

9. A method of measuring a parameter of a metal that is at least near its molten state, comprising the steps of:
generating a primary alternating electromagnetic field at a frequency such that the field penetrates into the metal a depth $\delta$, to thereby induce electrical currents in the metal; and detecting the magnitude of a component of a secondary alternating electromagnetic field which is generated by the induced electrical currents and which is dependent upon the measured parameter of the metal, said detected component being phase-shifted in relation to the phase of the primary generated electromagnetic field to thereby substantially eliminate the effects on the primary electromagnetic field of disturbing fields which result from the ambient surroundings, said detection taking place at a location spaced a nominal distance D from the electrically conductive material wherein the ratio ($\delta/D$) lies between 0.1 and 3 so that the effect of a change of the measured parameter can be distinguished from changes in other parameters.

10. A method as claimed in claim 9, characterized in that a component of the secondary electromagnetic alternating field is detected, which component substantially corresponds to induced currents at a predetermined depth under the surface of the electrically conductive material.

11. A method as claimed in claim 9, characterized in that a component of the secondary electromagnetic alternating field is detected, which component substantially corresponds solely to currents induced in the surface layer of the electrically conductive material.

12. A method as claimed in claims 9, 10 or 11, characterized in that a component of the total electromagnetic alternating field is detected at said location of detection, said component being phase-shifted substantially 90° in relation to the phase of the primary generated electromagnetic alternating field at the place of detection.

13. A method as claimed in claim 9, wherein when the disturbing fields are dependent on temperature, a suitable phase is determined for the detected component by varying the ambient temperature at different phases for the detected component, in the absence of electrically conductive material, and selecting the phase giving the least detected alternating field variation.

14. A method as claimed in claim 13, wherein said ratio lies between 0.3 and 1.

15. The method of claim 9 wherein the frequency of said primary alternating electromagnetic field is in the range of 50–100 Hz.

16. The method of claim 9 wherein the frequency of said primary alternating electromagnetic field is in the range of 150–200 Hz.

17. A method of measuring at least two independent parameters of a metal that is at least near its molten state, comprising the steps of:
generating a primary alternating electromagnetic field at a frequency such that the field penetrates into the metal a depth $\delta$, to thereby induce electrical currents in the metal;
detecting the magnitude of a first component of a secondary alternating electromagnetic field which is generated by the induced electrical currents and which is dependent upon one of the parameters to be measured, said detected component having a predetermined phase relationship relative to the primary generated electromagnetic field, said detection taking place at a location spaced a nominal distance D from the electrically conductive material wherein the ratio ($\delta/D$) lies between 0.1 and 3; and detecting a second component of said secondary electromagnetic field, said second component corresponding solely to currents induced in depth in the electrically conductive material, to determine the value of the second parameter to be measured.

18. A method as claimed in claim 17 characterized in that one of the independent quantities is determined by forming the ratio between the two detected components.

19. A method as claimed in claim 17, characterized in that one of the independent quantities is determined selectively by detecting a component of the secondary alternating field having a particular phase relative to the primary alternating field.

20. A method as claimed in claim 19, characterized in that the second component of the secondary electromagnetic alternating field is detected by detecting a component thereof which is substantially in phase with, the generated electromagnetic field at the place of detection.

21. A method as claimed in claim 17 wherein the second component of the secondary electromagnetic alternating field is detected by detecting a component of the secondary field which is 180° out of phase with the primary generated electromagnetic field.

* * * * *